Patented Mar. 2, 1954

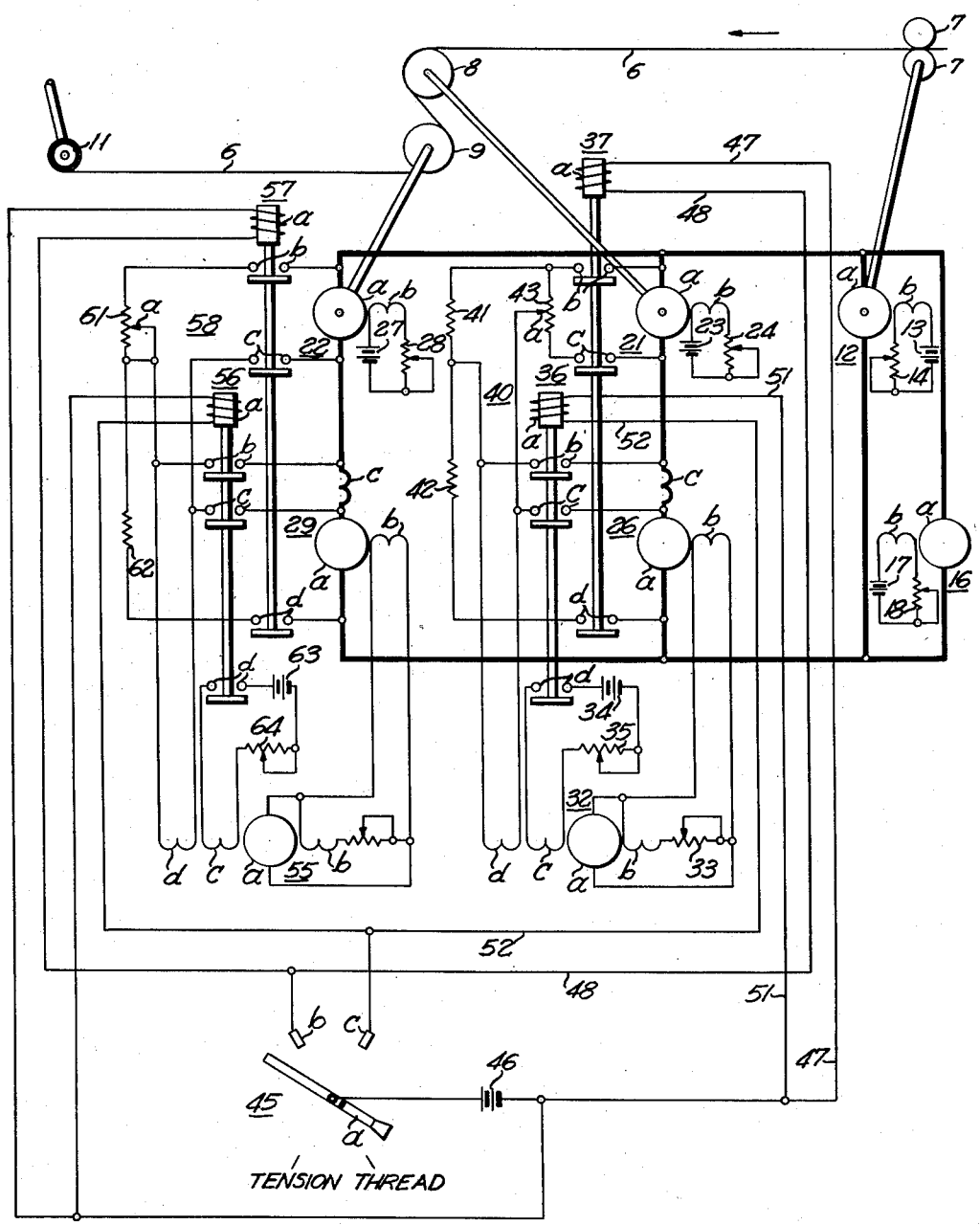

2,671,193

UNITED STATES PATENT OFFICE 2,671,193

ELECTRIC MOTOR CONTROL SYSTEM UTILIZING BRIDGE CIRCUIT FOR SPEED CONTROL

Robert M. Peeples, Milwaukee, Wis., assignor to Allis-Chalmers Manufacturing Company, Milwaukee, Wis.

Application September 4, 1951, Serial No. 245,001

4 Claims. (Cl. 318—331)

This invention relates in general to motor control systems and in particular to systems for controlling the speed of electric motors.

In rolling mills, where a strip of material, such as steel, is threaded through the stand rolls and the tensioning rolls of the mill prior to attaching the strip to a delivery reel, it is necessary to accurately control the speeds of the rolls during such threading so that the strip is not permitted to become slack or become excessively taut between rolls. Heretofore, the speed of the roll driving motor was either controlled by manual adjustment of the motor field currents or by using tachometer generators driven at speeds proportional to the speeds of the rolls to furnish voltages which controlled the roll driving motors to maintain the proper speeds. However, adjustment of the motor field current varies the motor torque, and the use of tachometer generator has the disadvantage that, since the threading is done at a very low speed, which speed is a small fraction of the speed of the mill when rolling under tension, the output voltages of the tachometer generators are small and therefore unable to exert any considerable controlling effect without amplification. Additionally, the accuracy of the tachometer generators at this low threading speed is poor, thereby rendering accurate control of the roll speeds difficult.

These disadvantages may be overcome by utilizing the voltages of the roll driving motors as measures of the roll speeds and utilizing these voltages to control the roll speeds.

It is therefore an object of this invention to provide an improved system for controlling the speed of an electric motor.

It is a further object of this invention to provide an improved motor control system utilizing an electrical characteristic of the motor as a measure of the motor speed.

It is an additional object of the present invention to provide an improved system for controlling the threading and tensioning of a strip of material in a mill, in which system a common electroresponsive element is utilized to control both the threading and the tensioning.

Objects and advantages other than those set forth above will be apparent from the following description when read in connection with the accompanying drawing, the single figure of which diagrammatically illustrates the circuits and apparatus of two embodiments of the invention.

Referring to the drawing, the invention is illustrated applied to the control of a strip of material 6, such as steel, being worked by a plurality of work devices. For the purpose of showing the movement of strip 6, the strip is shown in the position it occupies at an intermediate point in the rolling operation and the circuit elements are shown in their deenergized position prior to threading. The work devices may comprise reducing rolls 7 of one stand of a rolling mill, and delivery tension rolls or devices 8, 9. Strip 6 is moved in the arrow direction through rolls 7, around rolls 8, 9 and is then wound on a delivery reel 11. Reel 11 may be driven by any suitable known means (not shown). Rolls 7 are driven by any suitable known means such as an electric motor 12 having an armature 12a and a field winding 12b. Field winding 12b is supplied with current from a battery 13 through an adjustable resistor 14. Armature 12a is supplied with current from the armature 16a of an electric generator 16 having a field winding 16b energized from a battery 17 through an adjustable resistor 18.

Roll 8 is driven by a motor 21 having an armature 21a and a field winding 21b. Field winding 21b is supplied with current from a battery 23 through an adjustable resistor 24, and armature 21a is connected across armature 16a in series with the armature 26a and the interpole winding 26c of a booster generator 26. Roll 9 is similarly driven by a motor 22 having an armature 22a and a field winding 22b. Field winding 22b is supplied with current from a battery 27 through an adjustable resistor 28, and armature 22a is connected across armature 16a in series with the armature 29a and the interpole winding 29c of a booster generator 29.

Field winding 26b of booster generator 26 is supplied with current from any suitable known controllable source of direct current, such as the armature 32a of an exciter generator 32 having a self-energized field winding 32b and a pair of differentially acting control fields 32c, 32d. Field winding 32b is connected across armature 32a in series with an adjustable resistor 33, and field winding 32c is connected to a battery 34 and an adjustable resistor 35 through the contacts 36d of suitable switching means such as a solenoid operated relay 36 having an operating coil 36a and additional contacts 36b, 36c.

The energization of field winding 32d is controlled by relay 36 and by additional switching means comprising a relay 37 having an operating coil 37a and contacts 37b, 37c, 37d. Contacts 37b, 37c, 37d energize a bridge circuit 40 having as two sides thereof a pair of resistors 41, 42 and having as the other sides thereof armature 26a, interpole winding 26c and an adjustable portion of a resistor 43 connected across motor armature 21a and having an adjustable tap 43a to form a voltage divider. The input energy for bridge 40 is supplied from armature 16a, and the bridge output appears between adjustable tap 43a and the common terminal of resistors 41, 42, which output is impressed on field winding 32d when contacts 37b, 37c, 37d are closed. When contacts 36b, 36c are closed, field winding 32d is connected across interpole winding 26c.

The energization of coils 36a, 37a is controlled by any suitable known means such as a master switch 45 having an operating handle 45a adapted to selectively engage a pair of contacts 45b, 45c to selectively connect coils 36a, 37a to a battery 46. When handle 45a engages contact 45b, coil 37a is connected to battery 46 through a circuit which may be traced from battery 46 through a conductor 47, coil 37a, a conductor 48, contact 45b and handle 45a back to battery 46. When handle 45a is moved to engage contact 45c, coil 36a is energized through a circuit which may be traced from battery 46, a conductor 51, coil 36a, a conductor 52, contact 45c, handle 45a and back to battery 46. When handle 45a is in the position shown, both coils 36a, 37a are deenergized.

Field winding 29b is energized from the armature 55a of an exciter generator 55 having a self exciting field winding 55b and a pair of differentially acting field windings 55c, 55d. Field windings 55c, 55d are controlled in a manner similar to windings 32c, 32d by switching means comprising relays 56, 57 similar to relays 36, 37. Field winding 55d is connected by contacts 57b, 57c, 57d to the output terminals of a bridge circuit 58 having as two sides thereof armature 22a, interpole winding 29c and armature 29a and having as the other sides thereof an adjustable resistor 61 and a resistor 62. Relay 56 connects field winding 55d across interpole winding 29c and connects field winding 55c to a battery 63 through an adjustable resistor 64. Coil 56a of relay 56 is connected in parallel with coil 36a across battery 46, and coil 57a of relay 57 is connected in parallel with coil 37a, so that coils 36a, 56a are energized when contact 45c is closed, and coils 37a, 57a are energized when contact 45b is closed.

In operation, the currents in the field windings of motors 12, 21 and 22 are adjusted to preselected values for the desired threading speed, the speed of motor 12 determining the speed of the rest of the mill. The excitation of field winding 16b is then adjusted to produce in armature 16a the voltage required to cause motor 12 to operate at the desired threading speed. Handle 45a is moved to engage contact 45b, thereby energizing coils 37a, 57a to cause closure of contacts 37b, 37c, 37d, 57b, 57c, 57d. Field winding 32d is thus connected across the output terminals of bridge 40, and field winding 55d is connected across the output terminals of bridge 58.

The adjustable taps 43a, 61a are set at a position on resistors 43, 61, respectively, corresponding to the desired threading speed, and if the voltages impressed on armatures 21a, 22a are sufficient to produce the desired threading speeds of motors 21, 22, the voltage of resistor 41 is equal to the voltage of the upper portion of divider 43 and the voltage of armature 22a is equal to the voltage of resistor 61, so that no voltage appears across the output terminals of bridges 40, 58. Field windings 32d, 55d are therefore deenergized, resulting in zero voltage across armatures 32a, 55a, zero current in field windings 26b, 29b, and zero generated voltage across booster generator armatures 26a, 29a. Rolls 7, 8, 9 are then operating at a constant lineal speed and the strip 6 may be threaded through rolls 7, 8, 9 at a constant speed.

If the potential of adjustable tap 43a is lower than the potential of the common terminal of resistors 41, 42, indicating that the voltage and threading speed of motor 21 are below the desired value, field winding 32d is energized to produce a voltage across the armature 32a of exciter 32, which voltage is impressed on field winding 26b. This voltage across field winding 26b produces across armature 26a a voltage of cumulative polarity with respect to the voltage of armature 16a, so that the terminal voltage of motor 21 is increased to thereby increase the motor speed to the desired value. This action again balances bridge 40 and field winding 32d is deenergized. Assuming that resistor 33 is so adjusted that field winding 32b supplies all of the excitation required to maintain the voltage of armature 32a at any given value, the voltage of armature 32a remains at the value required to produce the voltage across armature 26a to maintain bridge 40 in the balanced condition.

Similarly, if the potential of tap 43a is higher than the potential of the common terminal of resistors 41, 42, indicating that the voltage and speed of motor 21 are above the desired value, field winding 32d is energized in a direction to cause the generated voltage of armature 26a to oppose the voltage of armature 16a to thereby reduce the voltage and speed of motor 21 to the desired value. The operation of bridge 58 to maintain the speed of motor 22 at the desired value is similar to that described above for bridge 40. The system therefore operates to maintain constant terminal voltage of motors 21, 22 to thereby maintain substantially constant no-load speed of these motors. If the IR drops in motors 21, 22 are substantial after the strip is threaded around rolls 8, 9, any suitable known means may be utilized to provide compensation in bridge circuits 40, 58 for these IR drops.

When the strip has been threaded through rolls 7, 8, 9 and has been secured to reel 11 by any suitable known means, such as a belt wrapper (not shown), rolling of the strip under tension begins. The field current of generator 16 is increased to increase the voltage of armature 16a to thereby increase the speeds of motors 12, 21, 22, and handle 45a is moved to engage contact 45c. This latter action deenergizes coils 37a, 57a to thereby disconnect field windings 32d, 55d from bridge circuits 40, 58, respectively, and energizes coils 36a, 56a. Relay 36 thereupon closes its contacts to connect field winding 32d across interpole winding 26c and to connect field winding 32c to battery 34 and resistor 35. Relay 56 similarly connects field winding 55d across interpole winding 29c and connects winding 55c to battery 63 and resistor 64. Field windings 32c, 32d, 55c, 55d thereupon operate in a well known manner to maintain constant the current flowing in armatures 21a, 22a to thereby maintain constant tension in strip 6 as the strip winds on reel 11. The value of tension maintained may be varied by adjustment of resistors 35, 64.

Although but two embodiments have been illustrated and described, it will be apparent to those skilled in the art that various changes and modifications may be made therein without departing from the spirit of the invention or from the scope of the appended claims.

It is claimed and desired to secure by Letters Patent:

1. In a system for controlling the speed of a work device, the combination of a motor for driving said device, said motor having an armature winding, a source of current for supplying said motor armature winding, a booster generator having an armature winding connected in series with said motor armature winding and said source, an electroresponsive element for controlling the voltage of either polarity of said booster armature winding, a first resistor and a second resistor serially connected across said source, a third resistor connected across said motor armature winding, an adjustable tap for said third resistor, and means connecting said electroresponsive element between said adjustable tap and the common terminal of said first and second resistors, whereby said electroresponsive element controls said booster armature winding voltage to maintain the speed of said motor substantially constant at a predetermined value dependent upon the position of said adjustable tap.

2. In a system for controlling the speed of a work device, the combination of a motor for driving said device, said motor having an armature winding, a source of current for supplying said motor armature winding, a booster generator having an armature winding connected in series with said motor armature winding and said source, an electroresponsive element for controlling the voltage of either polarity of said booster armature winding, a first resistor and a second resistor serially connected across said source, an adjustable tap for said second resistor, and means connecting said electroresponsive element between said adjustable tap and the common terminal of said armature windings, whereby said electroresponsive element controls said booster armature winding voltage to maintain the speed of said motor substantially constant at a predetermined value dependent upon the position of said adjustable tap.

3. In a system for controlling the speed of a work device, the combination of a motor for driving said device, said motor having an armature winding, a source of current for supplying said motor armature winding, a booster generator having an armature winding connected in series with said motor armature winding and said source, an electroresponsive element for controlling the voltage of either polarity of said booster armature winding, a first resistor and a second resistor serially connected across said source, and means connecting said electroresponsive element between the common terminal of said resistors and the common terminal of said armature windings, whereby said electroresponsive element controls said booster armature winding voltage to main the speed of said motor substantially constant at a predetermined value.

4. In a system for controlling the speed of a work device, the combination of a motor for driving said device, said motor having an armature winding, a source of current for supplying said motor armature winding, a booster generator having an armature winding connected in series with said motor armature winding and said source, an exciter generator for controlling the voltage of either polarity of said booster armature winding, said exciter generator having a field winding for controlling the voltage of said exciter generator, a first resistor and a second resistor serially connected across said motor armature winding and said booster armature winding, a third resistor connected across said motor armature winding, an adjustable tap for said third resistor, and means connecting said field winding between said adjustable tap and the common terminal of said first and second resistors, whereby said exciter generator controls said booster armature winding voltage to maintain the speed of said motor substantially constant at a predetermined value dependent upon the position of said adjustable tap.

ROBERT M. PEEPLES.

References Cited in the file of this patent

UNITED STATES PATENTS

| Number | Name | Date |
| --- | --- | --- |
| 2,284,802 | Cook | June 2, 1942 |
| 2,306,157 | Edwards et al. | Dec. 22, 1942 |
| 2,465,226 | Harris | Mar. 22, 1949 |

FOREIGN PATENTS

| Number | Country | Date |
| --- | --- | --- |
| 580,005 | Great Britain | Aug. 23, 1946 |